(12) United States Patent  (10) Patent No.: US 9,714,723 B1
Hsu                         (45) Date of Patent:     Jul. 25, 2017

(54) SPEED-ADJUSTABLE RETURNING DEVICE OF VALVE ACTUATOR

(71) Applicant: Flowinn (Shanghai) Industrial Co., Ltd., Shanghai (CN)

(72) Inventor: Kuo-Feng Hsu, Shanghai (CN)

(73) Assignee: FLOWINN (SHANGHAI) INDUSTRIAL CO., LTD., Shanghai (CN)

( * ) Notice: Subject to any disclaimer, the term of this patent is extended or adjusted under 35 U.S.C. 154(b) by 0 days.

(21) Appl. No.: 15/075,201

(22) Filed: Mar. 21, 2016

(51) Int. Cl.
  *F16K 31/05*   (2006.01)
  *F16K 31/56*   (2006.01)
  *F16K 31/02*   (2006.01)
  *F16K 31/53*   (2006.01)

(52) U.S. Cl.
  CPC .............. *F16K 31/56* (2013.01); *F16K 31/02* (2013.01); *F16K 31/05* (2013.01); *F16K 31/53* (2013.01)

(58) Field of Classification Search
  CPC .......... F16K 31/56; F16K 31/53; F16K 31/02; F16K 31/05; F16K 31/04
  USPC ....... 251/69–71, 129.11–129.13, 248, 250.5, 251/337
  See application file for complete search history.

(56) References Cited

U.S. PATENT DOCUMENTS

| 3,258,985 A * | 7/1966 | Jordan | F16H 25/20 251/129.12 |
| 3,430,916 A * | 3/1969 | Raymond, Jr. | F16K 31/043 251/71 |
| 3,808,895 A * | 5/1974 | Fitzwater | F16K 17/36 251/71 |
| 4,794,314 A * | 12/1988 | Janu | F16K 31/046 251/129.12 |
| 5,195,721 A * | 3/1993 | Akkerman | F16K 31/04 251/129.13 |
| 5,915,668 A * | 6/1999 | Hodapp | F16K 31/563 251/129.12 |
| 6,155,533 A * | 12/2000 | Semeyn | F02D 11/107 251/69 |

\* cited by examiner

*Primary Examiner* — John Bastianelli
(74) *Attorney, Agent, or Firm* — Leong C. Lei

(57) ABSTRACT

A speed-adjustable returning device of a valve actuator including a transmission assembly, an energy storage device arranged at one side of the transmission assembly and is operatively coupled thereto, an arrestment device arranged beside the energy storage device and is operatively coupled to the transmission assembly, and a valve device arranged at one side of the transmission assembly and is operatively coupled thereto. Under a condition of normal power supply, the energy storage device is controlled to store energy, and when power supply is interrupted, the energy storage device releases the stored energy to drive the transmission assembly to operate in a reversed direction so that the transmission assembly drives the arrestment device in such a way that the arrestment device makes the transmission assembly and the energy storage device operated at fixed speeds to thereby make the valve device operated at a fixed speed.

9 Claims, 6 Drawing Sheets

SPEED-ADJUSTABLE RETURNING DEVICE OF VALVE ACTUATOR

TECHNICAL FIELD OF THE INVENTION

The present invention relates generally to a speed-adjustable returning device of a valve actuator, and more particularly to a speed-adjustable returning device of a valve actuator that regulates the operational speed in order to prevent damaging related facility and to make use safer.

DESCRIPTION OF THE PRIOR ART

A conventional piping network control device is used to achieve automatic control of a fluid pipeline and also to achieve automatic regulation through automatic control of activation/de-activation of the conventional piping network control device in order to replace the traditional way of manual operation and to allow the conventional piping network control device to activate/de-activate as desired under normal supply of electrical power. However, when power supply is interrupted, the conventional piping network control device will just stop at the last position and will generally not return to a safety position (such as complete opening or complete closing).

A conventional spring-based returning device is structured based on the idea of accumulating mechanical energy, where under normal supply of electrical power, the conventional spring-based returning device is operated by having electrical power activating a motor to cause energy to be accumulated or stored in the spring of the conventional spring-based returning device. When the power supply is interrupted, the spring simply releases the energy accumulated or stored therein to cause the spring-based returning device to return to the safety position (such as complete opening or complete closing). The returning speed, however, is quite fast (where returning is completed in 2-3 seconds). This may readily lead to an excessively abrupt change of the flow rate in the pipeline and water hammering may occur and causes damages.

In view of the above, it is desired to provide a solution to overcome the problem.

SUMMARY OF THE INVENTION

The present invention aims to provide a speed-adjustable returning device of a valve actuator that regulates the operational speed to prevent damaging related facility and to make use safer.

The primary object of the present invention is to prevent related facility from being damaged when power supply is accidentally interrupted.

Another object of the present invention is to improve safety of use.

To achieve the above objects, the present invention generally comprises at least one transmission assembly, at least one energy storage device arranged at one side of the transmission assembly and is operatively coupled thereto, at least one arrestment device arranged beside the energy storage device and operatively coupled to the transmission assembly, at least one power device arranged at one side of and coupled to the transmission assembly, and at least one valve device arranged at one side of the transmission assembly and operatively coupled thereto.

Under a condition of normal power supply, the power device generates and transmits kinetic energy to the transmission assembly to control an operation of the valve device and to transmit, via the transmission assembly, kinetic energy to the energy storage device for storage. When the energy stored in the energy storage device is sufficient, the arrestment device constrains, via the transmission assembly, the operation of the energy storage device to preserve the stored energy.

When power supply is interrupted, the arrestment device stops the operation thereof to release the constraint of the energy storage device and the energy storage device is allowed to release the energy stored therein to drive the transmission assembly, so that the transmission assembly is put into operation in a reversed direction and simultaneously drives the arrestment device to operate in such a way that the arrestment device makes the transmission assembly to operate at a fixed speed. The transmission assembly also drives the valve device to operate at a fixed speed. With such a technique, the present invention may help overcome the drawbacks of the conventional spring-based returning device that the returning speed is fast and thus causes water hammering that leads to undesired damages and also help regulate the operational speed to prevent undesired damages occurring on related facility and to make uses safer.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
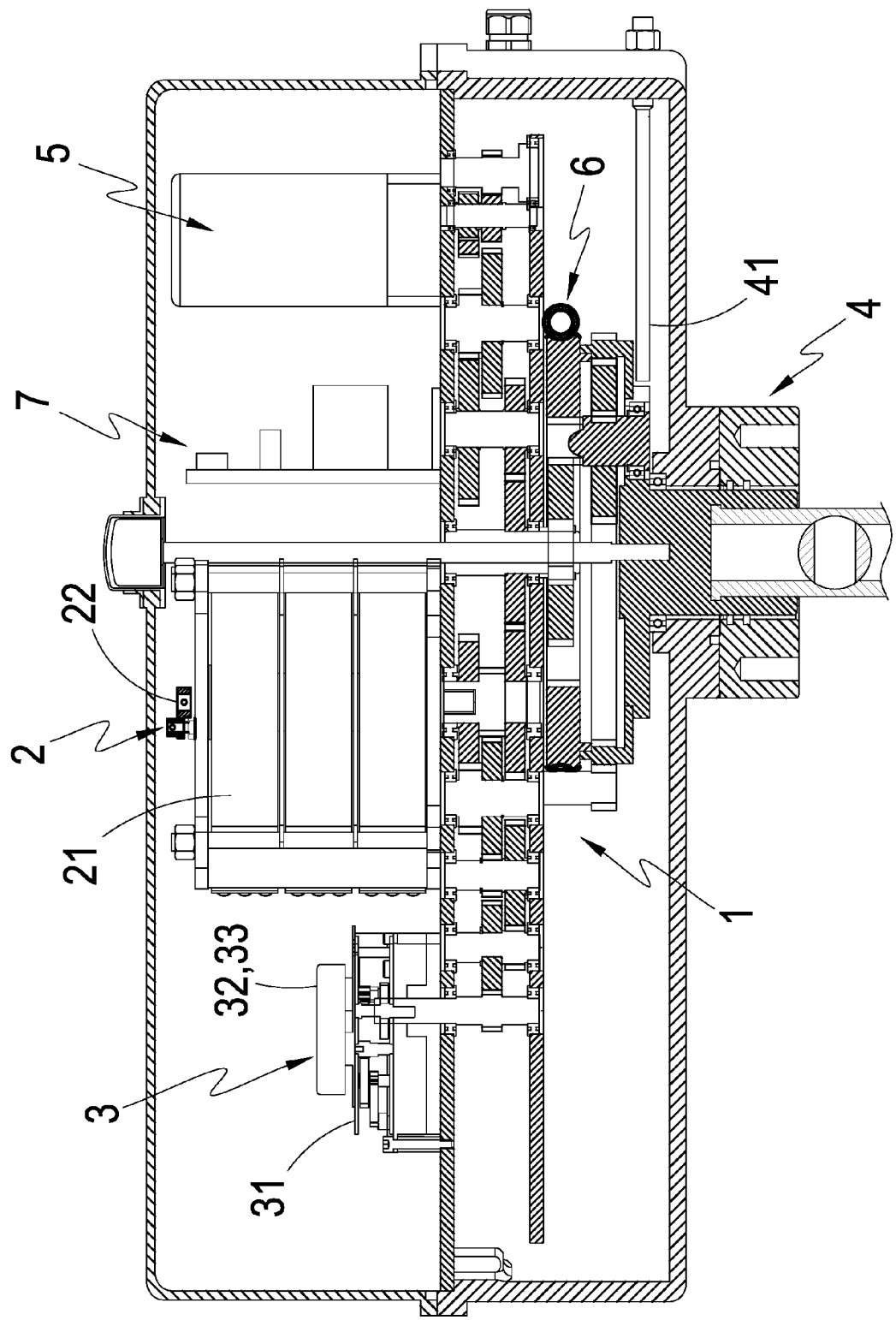
FIG. 1 is a schematic view illustrating a preferred embodiment of the present invention.
Figure 2:
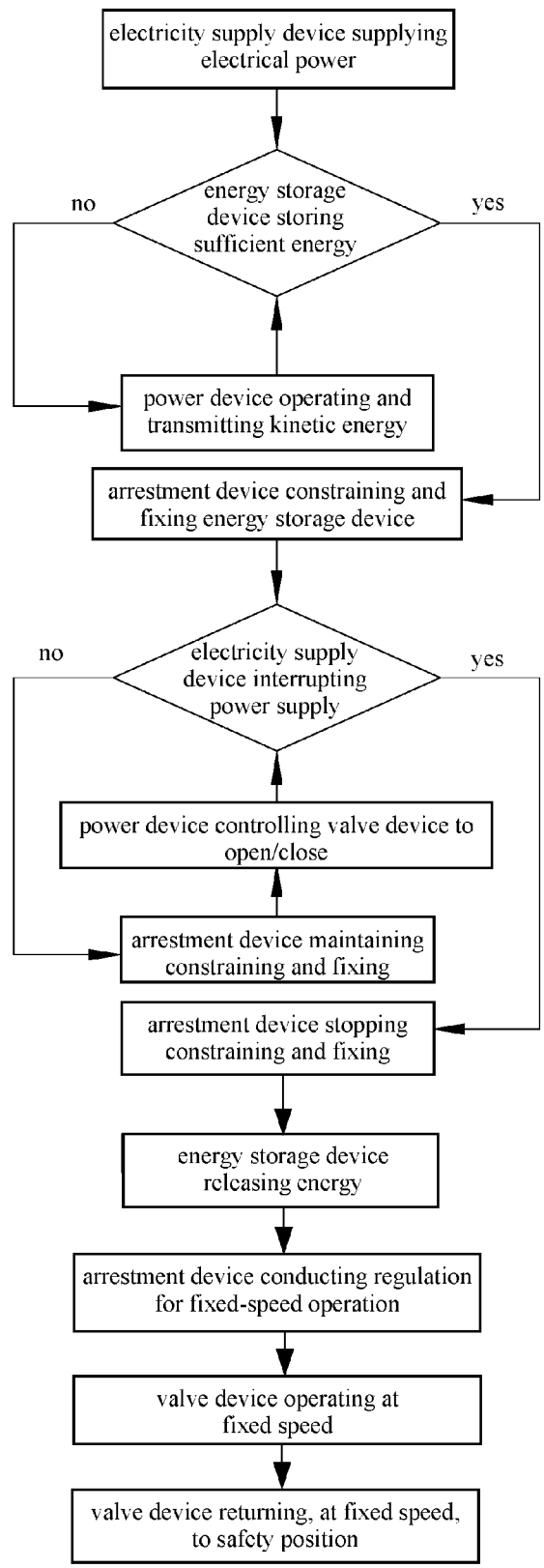
FIG. 2 is a flow chart illustrating an operation process of the preferred embodiment of the present invention.
Figure 3:
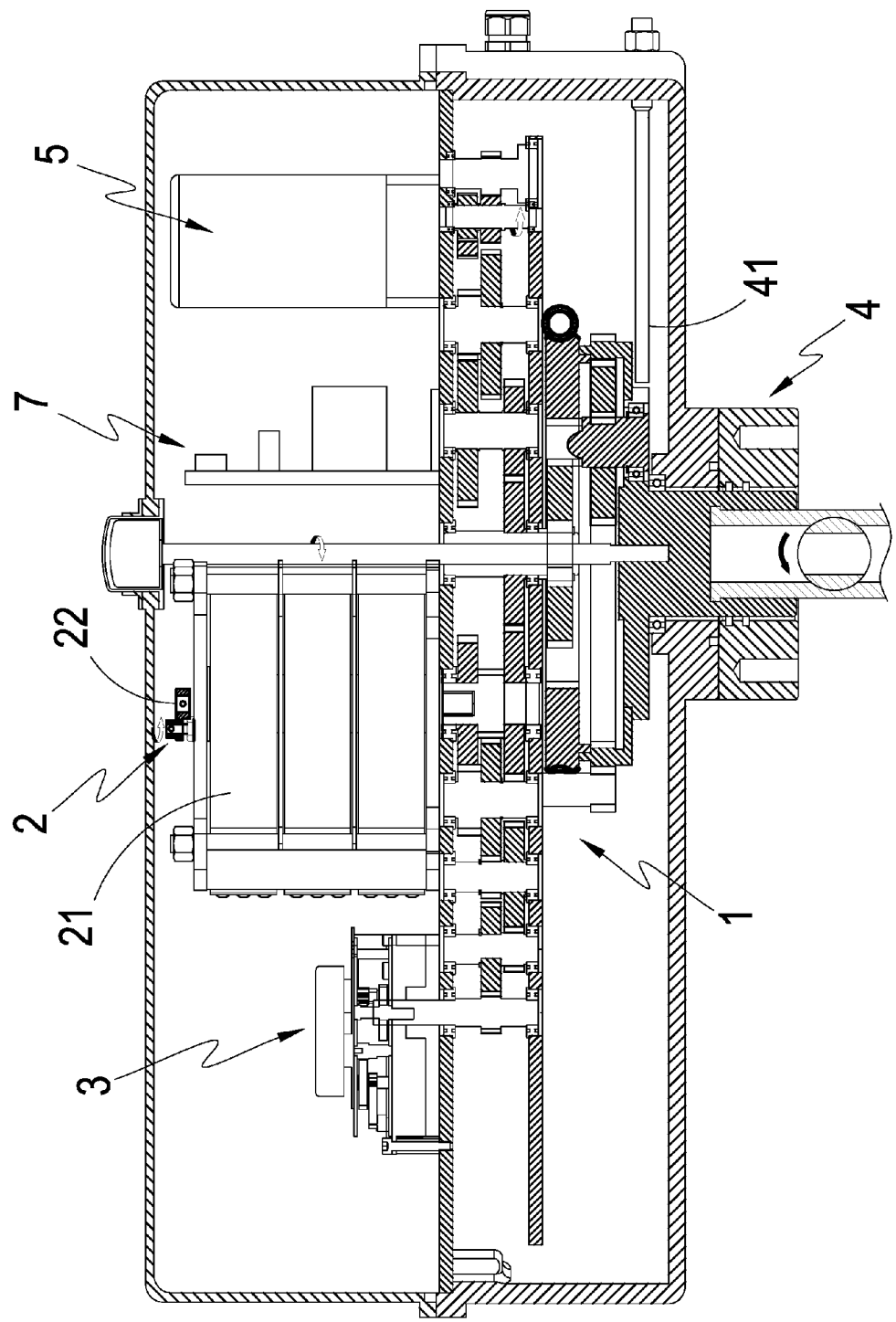
FIG. 3 is a schematic view illustrating energy storage of the preferred embodiment of the present invention when power is supplied thereto.
Figure 4:
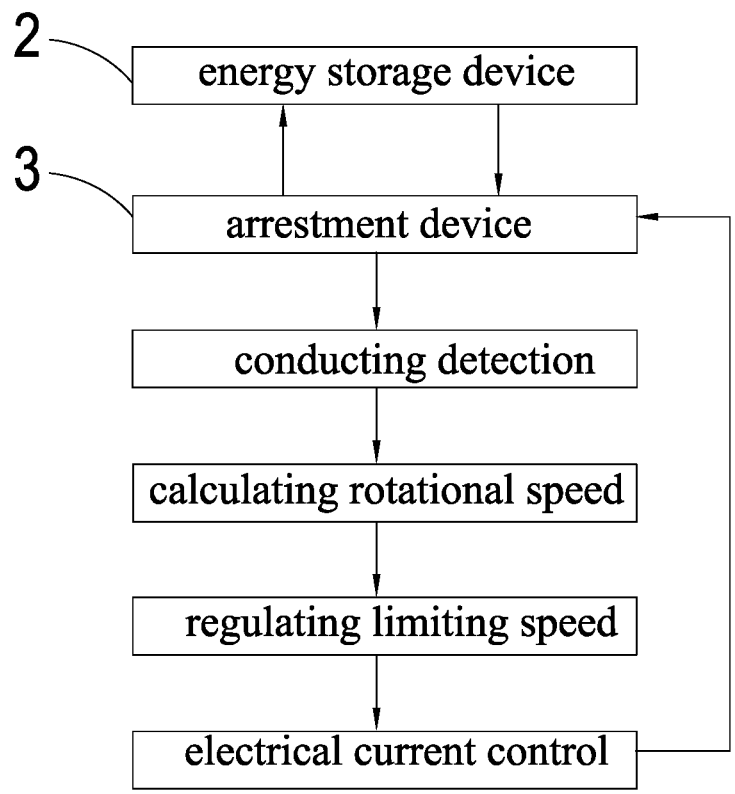
FIG. 4 is a block diagram illustrating an arresting operation of the preferred embodiment of the present invention.
Figure 5:
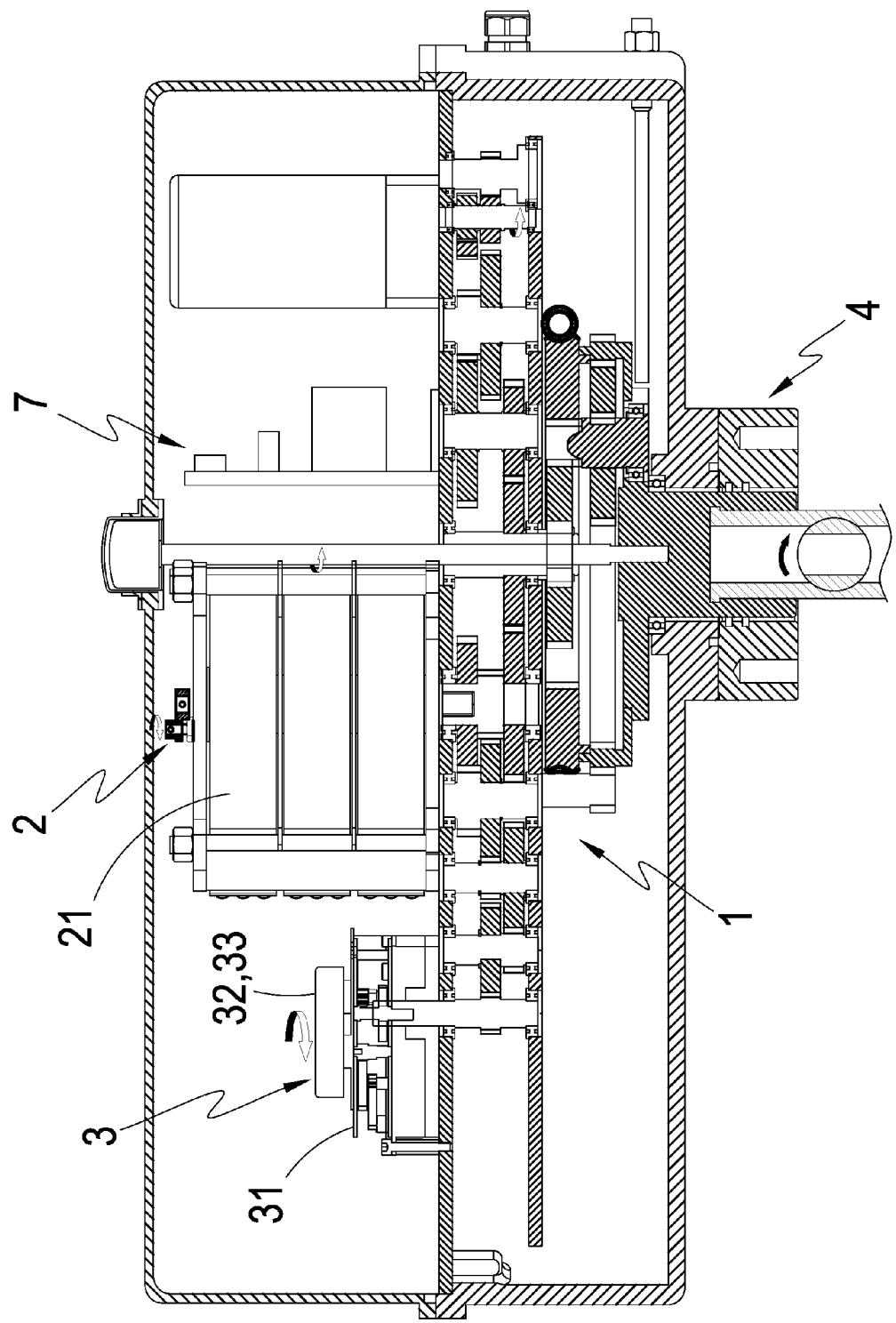
FIG. 5 is a schematic view illustrating arresting of the preferred embodiment of the present invention when power supply is interrupted.
Figure 6:
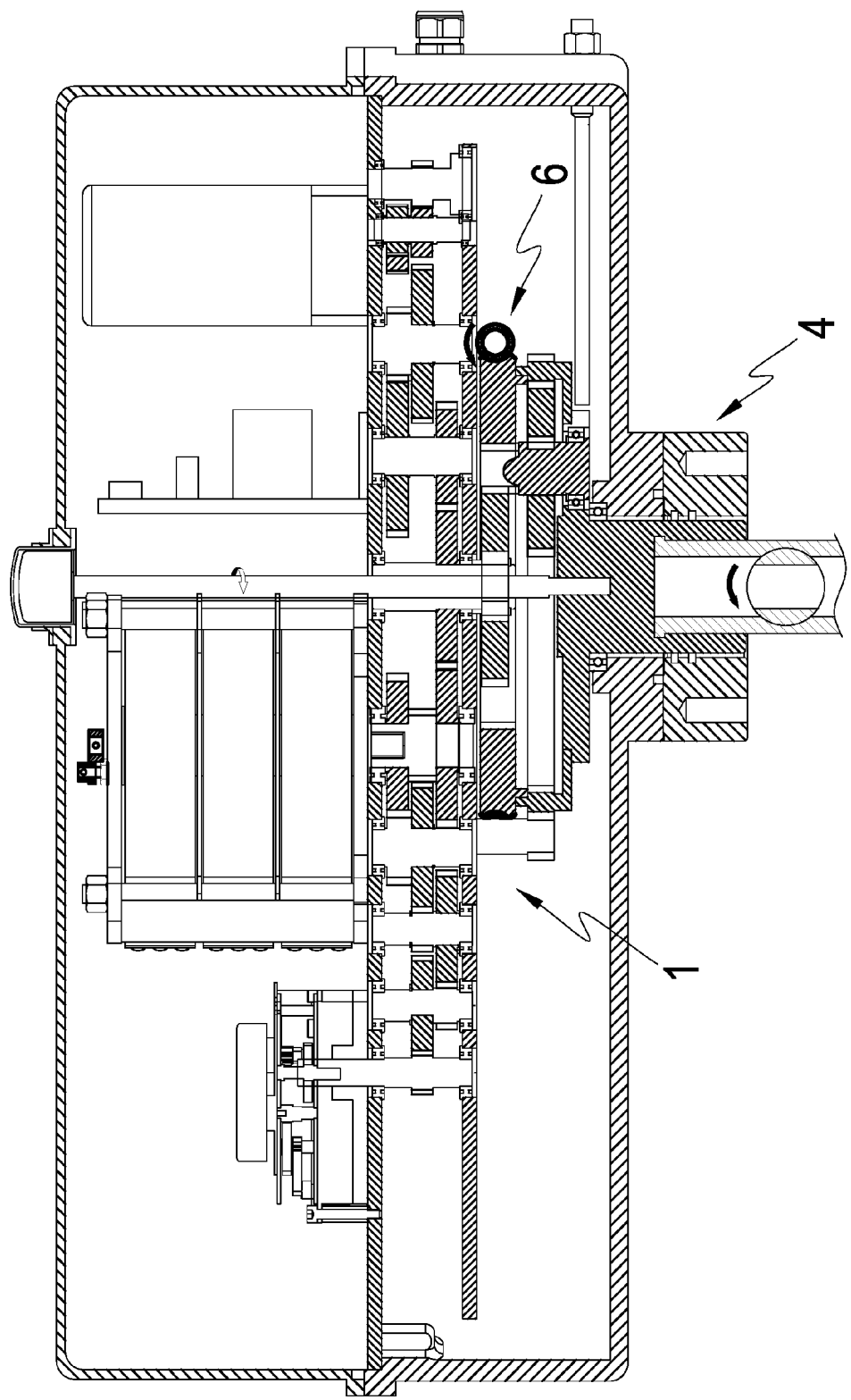
FIG. 6 is a schematic view illustrating manual control of the preferred embodiment of the present invention.

Referring to FIG. 1, which is a schematic view illustrating the structure of a preferred embodiment of the present invention, as clearly shown in the drawing, the present invention generally comprises at least one transmission assembly 1, at least one energy storage device 2, at least one arrestment device 3, at least one valve device 4, at least one power device 5, and at least one manual opening/closing device 6, wherein the transmission assembly 1 comprises at least one planetary gear set.

The energy storage device 2 is arranged at one side of the transmission assembly 1 and is operatively coupled thereto. The energy storage device 2 comprises at least one elastic element 21 for storing and releasing kinetic energy and at least one detection device 22 arranged at one side of the elastic element 21 to detect the kinetic energy stored therein. The elastic element 21 can be a spiral spring. The detection device 22 is in information connection with the arrestment device 3.

The arrestment device 3 is arranged beside the energy storage device 2 and is operatively coupled to the transmission assembly 1 to control an operation of the transmission assembly 1, the energy storage device 2, or the valve device 4. The arrestment device 3 comprises at least one power generation device 32, at least one rotational speed detection device 31 arranged beside the power generation device 32 and electrically connected thereto, and at least one rotational speed control device 33 arranged beside the power generation device 32 and is operable in combination with the power generation device 32 and the rotational speed detection device 31.

The valve device 4 is arranged at one side of the transmission assembly 1 and is operatively coupled thereto and comprises at least one determination device 41 operable in combination with the transmission assembly 1.

The power device 5 is coupled to and arranged at one side of the transmission assembly 1. The power device 5 generates and supplies kinematic energy to the transmission assembly 1 to control an operation of the valve device 4 and for storage of the kinetic energy in the energy storage device 2. The power device 5 is provided, at one side thereof, with at least one operating device (not labeled) in information connection therewith. The power device 5 is provided, at one side thereof, with at least one electricity supply device 7, and the electricity supply device 7 is electrically connected to the power device 5 and the arrestment device 3 to supply electrical power thereto.

The valve device 4 is provided, at one side thereof, with at least one manual opening/closing device 6 that is operatively coupled to the transmission assembly 1. The manual opening/closing device 6 is structured for controlling an operation of the valve device 4. The above provides just an embodiment of the present invention and the present invention is not limited to such an embodiment.

Referring to FIGS. 1-6, which are respectively a schematic view illustrating a preferred embodiment of the present invention, a flow chart illustrating an operation process of the preferred embodiment of the present invention, schematic view illustrating energy storage of the preferred embodiment of the present invention when power is supplied thereto, a block diagram illustrating an arresting operation of the preferred embodiment of the present invention, a schematic view illustrating arresting of the preferred embodiment of the present invention when power supply is interrupted, and a schematic view illustrating manual control of the preferred embodiment of the present invention, as clearly shown in the drawings, under a normal condition, the electricity supply device 7 supplies electrical power to the power device 5 and the arrestment device 3, and the power device 5 is operated to transmit kinetic energy through the transmission assembly 1 to the valve device 4 to cause an operation thereof to reach a predetermined state (such as a predetermined open state). The determination device 41 determines if the valve device 4 reaches the predetermined state and under such a condition, the transmission assembly 1 switches the supply of power to the energy storage device 2 for storage of energy. The energy storage device 2 uses the twisting or winding of the elastic element 21 to store kinetic energy and uses the detection device 22 to detect the kinetic energy stored in the elastic element 21 so that when the storage of kinetic energy is sufficient, information is issued to the arrestment device 3 to make the arrestment device 3 to constrain and fix, via the transmission assembly 1, the energy storage device 2 and the elastic element 21 thereof in order to preserve the stored energy. Thereafter, a user, when desired, may use the operating/actuation device (the power device 5) to control opening/closing of the valve device 4, while the arrestment device 3 maintains constraining and fixing the energy storage device 2 to preserve the energy stored.

When interruption of power supply occurs in the electricity supply device 7, the arrestment device 3 stops constraining and fixing the elastic element 21 (the energy storage device 2) to allow the elastic element 21 to rewind for releasing the kinetic energy for driving the transmission assembly 1 for energy releasing. The energy releasing operation of the transmission assembly 1 is conducted in a direction opposite to that of energy storage so that at the same time, the arrestment device 3 is also driven by the transmission assembly 1 to drive the power generation device 32 to generate electrical power, which is transmitted to the rotational speed detection device 31 and the rotational speed control device 33. Further, the rotational speed detection device 31 detects the rotational speed of the power generation device 32 and make information transmission to the rotational speed control device 33 so as to cause the rotational speed control device 33 to generate a resisting force for regulating the rotational speed of the power generation device 32 and thus regulating the operational speeds of the transmission assembly 1 and the energy storage device 2 (the elastic element 21) to achieve a fixed-speed operation. The transmission assembly 1 that is operated in the fixed-speed operation drives the valve device 4 to return, at a fixed speed, back to a safety position (such as complete opening or complete closing) so as to prevent damages caused by water hammering resulting from instantaneous abrupt change of flow rate in a pipeline.

Further, the user may conduct a manual operation by means of the manual opening/closing device 6 in order to open/close, via the transmission assembly 1, the valve device 4 as desired.

In summary, the speed-adjustable returning device of a valve actuator according to the present invention relies on the following features to overcome the drawbacks of the prior art:

(1) The collaborative operation among the transmission assembly 1, the energy storage device 2, the arrestment device 3, and the valve device 4 allows the present invention to achieve regulation of operational speed in order to prevent damaging the related facility and make the operation and use safer.

(2) The manual opening/closing device 6 is provided to control opening/closing of the valve device 4, allowing for convenience of use of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A speed-adjustable returning device of a valve actuator, comprising:
   at least one transmission assembly;
   at least one energy storage device, which is arranged at one side of the transmission assembly and is operatively coupled thereto, wherein the energy storage device release energy stored therein during an interruption of power supply in order to drive the transmission assembly;
   at least one arrestment device, which is arranged beside the energy storage device and is operatively coupled to the transmission assembly, wherein the arrestment device is operable to set the transmission assembly in a fixed-speed operation when the energy storage device releases the energy, wherein the arrestment device comprises at least one power generation device, at least one rotational speed detection device arranged beside the power generation device and electrically connected thereto, and at least one rotational speed control device arranged beside the power generation device and is operable in combination with the power generation device and the rotational speed detection device; and
   at least one valve device, which is arranged at one side of the transmission assembly and is operatively coupled thereto in order to perform a fixed-speed operation during the interruption of power supply.

2. The speed-adjustable returning device of the valve actuator according to claim 1, wherein at least one power device is arranged at one side of the transmission assembly and the power device generates and supplies kinematic energy the transmission assembly to control an operation of the valve device and for storage of the energy in the energy storage device.

3. The speed-adjustable returning device of the valve actuator according to claim 2, wherein the power device is provided, at one side thereof, with at least one electricity supply device, which is electrically connected to the power device and the arrestment device.

4. The speed-adjustable returning device of the valve actuator according to claim 2, wherein the power device is provided, at one side thereof, with at least one operating device in information connection therewith.

5. The speed-adjustable returning device of the valve actuator according to claim 1, wherein the valve device is provided, at one side thereof, with at least one manual opening/closing device that is operatively coupled to the transmission assembly and the manual opening/closing device controls an operation of the valve device.

6. The speed-adjustable returning device of the valve actuator according to claim 1, wherein the energy storage device comprises at least one elastic element for storing energy.

7. The speed-adjustable returning device of the valve actuator according to claim 6, wherein the energy storage device comprises at least one detection device arranged at one side of the elastic element to detect the energy stored in the elastic element, the detection device being in information connection with the arrestment device to selectively fix the elastic element.

8. The speed-adjustable returning device of the valve actuator according to claim 1, wherein the valve device comprises at least one determination device operable in combination with the transmission assembly.

9. The speed-adjustable returning device of the valve actuator according to claim 1, wherein the transmission assembly comprises at least one planetary gear set.

* * * * *